United States Patent
Cescot et al.

(10) Patent No.: US 9,267,692 B2
(45) Date of Patent: Feb. 23, 2016

(54) COOKING EQUIPMENT AND A METHOD OF DETECTING OPERATING CONDITIONS OF A COOKING EQUIPMENT

(71) Applicant: Electrolux Professional S.p.A., Pordenone (IT)

(72) Inventors: Paolo Cescot, Pordenone (IT); Riccardo Furlanetto, Pordenone (IT); Paolo Marcorin, Pordenone (IT); Erika Menosso, Pordenone (IT); Michele Simonato, Pordenone (IT)

(73) Assignee: ELECTROLUX PROFESSIONAL S.P.A., Pordenone (IT)

( * ) Notice: Subject to any disclaimer, the term of this patent is extended or adjusted under 35 U.S.C. 154(b) by 524 days.

(21) Appl. No.: 13/711,016

(22) Filed: Dec. 11, 2012

(65) Prior Publication Data

US 2013/0153562 A1 Jun. 20, 2013

(30) Foreign Application Priority Data

Dec. 16, 2011 (EP) .................................. 11194059

(51) Int. Cl.
*F24C 7/08* (2006.01)
*F24B 1/00* (2006.01)
(Continued)

(52) U.S. Cl.
CPC ... *F24B 1/00* (2013.01); *A21B 1/40* (2013.01); *F24C 7/085* (2013.01); *H05B 6/666* (2013.01)

(58) Field of Classification Search
None
See application file for complete search history.

(56) References Cited

U.S. PATENT DOCUMENTS

| 4,788,398 | A | | 11/1988 | Hornung |
| 5,111,027 | A | * | 5/1992 | Fowler .......................... 219/506 |

(Continued)

FOREIGN PATENT DOCUMENTS

| EP | 424365 A2 * | 4/1991 |
| EP | 1 093 321 A2 | 4/2001 |

(Continued)

OTHER PUBLICATIONS

Office Action issued in European Patent Application No. 11 194 059.9 dated Jun. 19, 2012.

(Continued)

*Primary Examiner* — Joseph M Pelham
(74) *Attorney, Agent, or Firm* — Pearne & Gordon LLP

(57) ABSTRACT

A cooking equipment includes an oven cavity (2); at least one energy source (3), operable to provide energy to food placed inside the oven cavity (2); a plurality of sensors (5), configured to provide respective measurement signals (STC, STWR, STWI, STE, STF1, ..., STFN, SH), indicative of respective quantities relating to a cooking process for cooking food in the oven cavity (2); and a control device (8), having at least one cooking program stored therein and configured to drive the at least one energy source (3) in accordance with the cooking program, based on the measurement signals (STC, STWR, STWI, STE, STF1, ..., STFN, SH) from the sensors (5). The cooking equipment also includes a storage unit (13), which contains first data (14, 15) indicative of energy required to carry out the at least one cooking program; and a processing unit (11), configured to determine, for the cooking program, an expected energy consumption level (EECL) from the first data (14, 15) and an actual energy consumption level (AECL) and to detect the presence of a malfunction based on a comparison of the expected energy consumption level (EECL) and of the actual energy consumption level (AECL).

17 Claims, 4 Drawing Sheets

(51) Int. Cl.
*A21B 1/40* (2006.01)
*H05B 6/66* (2006.01)

(56) References Cited

U.S. PATENT DOCUMENTS

| | | | |
|---|---|---|---|
| 6,250,215 B1* | 6/2001 | Brenn | 99/468 |
| 6,344,636 B1* | 2/2002 | Kim | 219/702 |
| 6,369,362 B1* | 4/2002 | Brenn | 219/401 |
| 7,030,349 B1* | 4/2006 | Graves et al. | 219/758 |
| 2006/0231551 A1* | 10/2006 | Ruther et al. | 219/707 |
| 2013/0156917 A1* | 6/2013 | Cescot et al. | 426/510 |
| 2013/0171305 A1* | 7/2013 | Cescot et al. | 426/231 |
| 2014/0150672 A1* | 6/2014 | Gurlek et al. | 99/325 |

FOREIGN PATENT DOCUMENTS

| | | |
|---|---|---|
| EP | 1 712 844 A2 | 10/2006 |
| WO | WO 2010082005 A2 * | 7/2010 |
| WO | WO 2011080110 A1 * | 7/2011 |

OTHER PUBLICATIONS

European Search Report issued in Application No. 11 19 4059 dated Jun. 7, 2012.

* cited by examiner

COOKING EQUIPMENT AND A METHOD OF DETECTING OPERATING CONDITIONS OF A COOKING EQUIPMENT

The present invention relates to a cooking equipment and to a method of detecting operating conditions of a cooking equipment.

As is known, performances of professional ovens are of the utmost importance, in terms of accurate control of cooking parameters and overall power consumption. The need for accurate control of cooking parameters (namely temperature and humidity) is evident, not to impair the quality of processed food. Power consumption of professional ovens is all but negligible and minimization is always a primary target. Therefore, not only daily cooking programs are to be carefully prepared to avoid unnecessary waste of energy (such as by minimizing the opening time of the oven cavity and by selecting appropriate order of recipes to be carried out), but also control of the power sources must be in the best conditions of efficiency. In fact, poor control often results in increased power consumption, irrespective of whether quality of processed food is affected or not.

Control systems of professional cooking equipments are quite complex and include several critical components. For example, factory calibration of sensors may not be sufficient to ensure accurate measurements through the whole life of the components. Likewise, sensitivity often drifts with component ageing, thus leading to systematic errors and reduced control efficiency. It is worth emphasizing that sensors need not to provide out-of-range values to impair control. Minor errors, which are not per se indicative of abnormal operating conditions, may not be detected and may have negative impact on overall performances, nonetheless.

Also electromechanical components, such as vent valves or components of steam generation unit (which are commonly provided in professional ovens), may undergo failure and alter cooking conditions and control quality.

Timely maintenance actions are therefore required to prevent decrease of performances of the cooking equipment.

However, known cooking equipments are not provided with functions allowing detection of minor problems in the equipment's components, such as drifts in the sensors—not causing general failures but being cause of possible errors or faults in the cooking process—, and giving guidance to decide maintenance or repair actions to preserve satisfactory performances in terms of cooking quality and/or power consumption.

Moreover, known cooking equipments are provided with functions allowing detection of sensor failures resulting in out of range signals, where the range comprises only the physical acceptable values.

It is an aim of the present invention to allow automatic detection of malfunctions in cooking equipments, so that general performances may be preserved.

In compliance with the above aims, according to the present invention there are provided a cooking equipment and a method of detecting operating conditions of a cooking equipment as defined in the appended set of claims.

In particular, according to a first aspect thereof, the present invention relates to a cooking equipment comprising:
an oven cavity;
at least one energy source, operable to provide energy to food placed inside the oven cavity;
a plurality of sensors, configured to provide respective measurement signals, indicative of respective quantities relating to a cooking process for cooking food in the oven cavity;
a control device, having at least one cooking program stored therein and configured to drive the at least one energy source in accordance with the cooking program, based on the measurement signals from the sensors;
a storage unit, which contains first data indicative of energy required to carry out the at least one cooking program; and
a processing unit, configured to determine, for the cooking program, an expected energy consumption level from the first data and an actual energy consumption level and to detect the presence of a malfunction based on a comparison of the expected energy consumption level and of the actual energy consumption level.

For the purposes of the present invention, with "malfunction" it is intended any incorrect functioning of the appliance in the cooking process, for example due to a fault in a component or to an error in the setting of the cooking process, such as an error in the positioning of a temperature probe inside the food to be cooked.

The storage unit may also contain second data, representative of expected patterns for corresponding monitored data, that include at least a set of the measurement signals, and the processing unit may be configured to run a procedure for locating detected malfunctions based on a deviation of the monitored data from the respective expected patterns.

The processing unit may be configured to run the procedure for locating detected malfunctions in response to detection of a malfunction.

The cooking equipment may also comprise one or more components, such as electromechanical components, having respective states and coupled to the processing unit for supplying respective state signals, wherein the monitored data include the state signals.

The expected patterns and the corresponding monitored data may be associated to respective components and the processing unit may be configured to locate malfunction at one of the components if the deviation of the respective monitored data from the respective expected patterns meets fault detection criteria.

The fault detection criteria may include the monitored data staying outside a band (i.e. a range) around the corresponding expected pattern for a time period.

The processing unit may be configured to determine the actual energy consumption level based on a actual activation time of the heat sources.

The first data may include:
first energy consumption data, indicative of energy required to set and maintain, in the oven cavity, operating conditions prescribed by the at least one cooking program stored in the control device, in the absence of food; and
second energy consumption data, indicative of additional energy that is to be supplied in excess of energy of the first energy consumption data in order to have a unit weight of the food processed in accordance with the cooking program;
and the processing unit may be configured to determine the expected energy consumption level based on the first energy consumption data and the second energy consumption data.

The cooking equipment may comprise a steam generation unit controlled by the control device for providing steam within the oven cavity.

According to a second aspect thereof, the present invention relates to a method of detecting operating conditions of a cooking equipment, the cooking equipment comprising an oven cavity and at least one energy source, operable to provide energy to food placed inside the oven cavity; the method comprising:

recording monitored data, indicative of respective quantities relating to a cooking process for cooking food in the oven cavity; and driving the at least one energy source in accordance with a cooking program, based on the monitored data;

determining, for the cooking program, an expected energy consumption level and an actual energy consumption level; and detecting the presence of a malfunction based on a comparison of the expected energy consumption level and of the actual energy consumption level.

The method may also comprise the step of locating detected malfunctions based on a deviation of the monitored data from respective expected patterns.

The expected patterns and the corresponding monitored data may be associated to respective components and the processing unit may be configured to locate malfunction at one of the components if the deviation of the respective monitored data from the respective expected patterns meets fault detection criteria.

The fault detection criteria may include the monitored data staying outside a band around the corresponding expected pattern for a time period.

The actual energy consumption level may be determined based on an actual activation time of the heat sources.

Alternatively, the actual energy consumption level may be determined based on a direct measurement of the power absorbed by the cooking equipment.

The first data may include:

first energy consumption data, indicative of energy required to set and maintain, in the oven cavity, operating conditions prescribed by the at least one cooking program stored in the control device, in the absence of food; and second energy consumption data, indicative of additional energy that is to be supplied in excess of energy of the first energy consumption data in order to have a unit weight of the food processed in accordance with the cooking program;

and the processing unit may be configured to determine the expected energy consumption level based on the first energy consumption data and the second energy consumption data.

A non-limiting embodiment of the present invention will now be described, by way of example, with reference to the accompanying drawings, in which.

Figure 1:
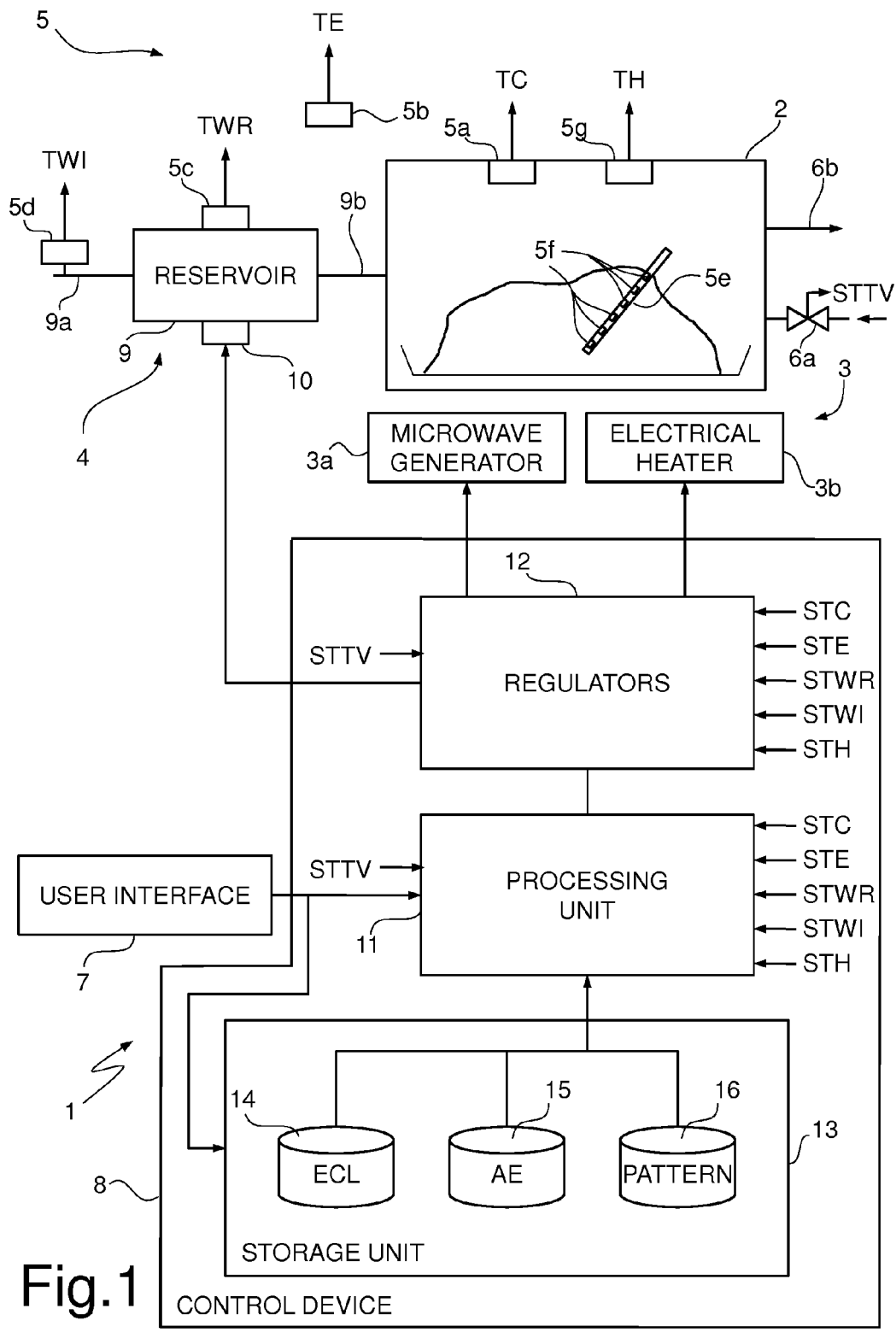
FIG. 1 is a simplified block diagram of a cooking equipment according to an embodiment of the present invention.

With reference to FIG. 1, referral number 1 indicates, as a whole, a professional cooking equipment, especially but not exclusively adapted for food services, represented in a schematic way.

The cooking equipment 1 comprises an oven cavity 2, for receiving food to be processed, a plurality of heating sources 3, at least one steam generation unit 4, for providing steam within the oven cavity 2, a plurality of sensors 5, a user interface 7 and a control device 8.

In one embodiment, the heating sources 3 comprise a microwave generator 3a, such as a magnetron, and an electrical heater 3b. In another embodiment, a gas burner may be provided in place of or in addition to microwave generator 3a and electrical heater 3b. A single heating source may be present, selected among the ones previously mentioned. The heating sources 3 are coupled to the control device 8 and selectively activated and deactivated in accordance with a cooking program stored therein. The heating sources 3 are furthermore coupled to the oven cavity 2 for delivering energy to the heating food to be processed. When activated, the heating sources 3 provide energy to food placed in the oven cavity 2, thereby causing the food to heat up.

The steam generation unit 4, which may be gas or electrically operated, comprises a water reservoir 9, having an inlet 9a and an outlet 9b that feeds into the oven cavity 2, and an energy source 10. The energy source 10 is coupled to the water reservoir 9 and is operable by the control device 8 to provide a controlled amount of steam to the oven cavity 2. In another embodiment, here not shown, the steam generation unit 4 may comprise nozzles spraying water on electrical heaters or directly into the oven cavity 2.

A throttle valve 6a is operable by the control device 8 to supply fresh air from outside into the oven cavity 2. The oven cavity 2 has also an exit 6b for the exhaust air. Humidity in the oven cavity 2 may be thus maintained at a level determined by the cooking program in the control device 8. State signal STTV provides information of a state of the throttle valve 6a. The state of the throttle valve 6a may be defined by a degree of opening.

In one embodiment, sensors 5 may include temperature sensors, such as:

a first temperature sensor 5a, for measuring a cavity temperature TC in the oven cavity 2;

a second temperature sensor 5b, for measuring environmental temperature TE outside the oven cavity 2;

a third temperature sensor 5c, for measuring a reservoir water temperature TWR in the water reservoir 9; and a fourth temperature sensor 5d, for measuring an inlet water temperature TWI at the inlet 9a of the water reservoir 9.

The sensors 5 may include also additional sensors, such as:

a pin temperature sensor 5e, with a plurality of probes 5f, for measuring respective internal temperatures $TF1, \ldots, TFN$, at respective depths, of a piece of food in the oven cavity 2; and humidity sensors 5g for measuring a humidity level H in the oven cavity 2.

The sensors 5 are coupled to the control device 8 for providing respective measurement signals STC, STWR, STWI, STE, $STF1, \ldots, STFN$, SH. The pin temperature sensor 5d may be wireless coupled.

The user interface 7 is coupled to the control device 8 and provides input and selection functions. For example, the user interface 7 may allow to define cooking programs, store cooking programs in the control device 8, select and retrieve stored cooking programs from the control device 8, define a number of iterations for selected cooking programs, set parameters of selected cooking programs (e.g. cooking level, browning), start selected cooking programs.

The control device 8 is configured to operate the heating sources 3 and the steam generation unit 4 in accordance with cooking programs set or selected by a user through the user interface 7. In order to achieve accurate control of the cooking process, the control device 8 receives measurement signals from the sensors 5 and drives the heating sources 3 and the steam generation unit 4 to generate in time temperature and humidity profiles determined by the selected cooking program.

The control device 8 is further configured to determine an actual energy consumption level of the cooking process being currently carried out and to decide on correct functioning or else malfunction of the cooking equipment 1 based on a comparison between the actual energy consumption level and an expected energy consumption level. In case a malfunction is detected, the control device 8 runs a diagnostic procedure to locate a possible cause of the malfunction. For this purpose, the control device 8 receives the measurement signals STC, STWR, STWI, STE, STF1, . . . , STFN, SH from the sensors 5 and the state signal STTV from the throttle valve 6a.

The control device 8 comprises a processing unit 11, regulators 12 and a data storage unit 13. The storage unit 13 includes a first database 14, a second database 15 and a third database 16. In particular, the storage unit 13 may include a single storage device, where all the databases are resident, or separate storage devices for the different databases.

The regulators 12 receive data relating to selected cooking program from the storage unit 13 and provide control functions of the heating sources 3 and of the steam generation unit 4.

The first database 14 contains first energy consumption data or ECL data (Energy Cooking Level), relating to the energy required to reach and maintain, in the oven cavity 2, temperature and humidity conditions prescribed by each available cooking program in the absence of food for a single cooking cycle. A typical use, albeit not the sole, of professional ovens is to perform few types of cooking processes, which are repeated many times. Each set of ECL data relate to a single iteration of a respective cooking process and account for energy to be supplied to maintain the oven cavity 2 at the temperature and humidity conditions prescribed by the cooking program for the respective cooking process. Moreover, ECL data relate to the empty oven cavity 2. In other words, ECL data is representative of the amount of energy needed to maintain an unbalance condition, in terms of temperature and humidity, between the oven cavity 2 without any food inside and the surrounding environment during a single cooking process. Therefore, the ECL data depend on the features of the cooking equipment 1 and are not correlated to the food to be processed.

In one embodiment, the ECL data include:

first iteration data, indicative of an initial excess energy IE required by the first iteration of the cooking process which is far greater than energy associated with subsequent iterations, because also the energy needed for the pre-heating step is to be accounted for; and subsequent iteration data, indicative of a common ECL value, that is the energy associated with subsequent iterations of the cooking process.

During pre-heating phase, the temperature of the oven mass rises up to a steady value. This is a state of thermal equilibrium between the oven and the surrounding environment.

The second database 15 contains second energy consumption data (indicated as AE data in FIG. 1), relating to additional energy that is to be supplied in excess of the ECL in order to have a unit weight of the food processed in accordance with the cooking program. Second energy consumption data are essentially determined by the kind and amount of food to be processed and the cooking program, but can be considered independent from the cooking equipment.

The third database 16 includes expected patterns EP of monitored operating data associated with respective cooking processes. Monitored operating data include measurement signals STC, STWR, STWI, STE, STF1, . . . , STFN, SH supplied by the sensors 5 and data relating to a state or a change of state of at least another component, such as electromechanical components, for example the throttle valve 6a.

Figure 2:
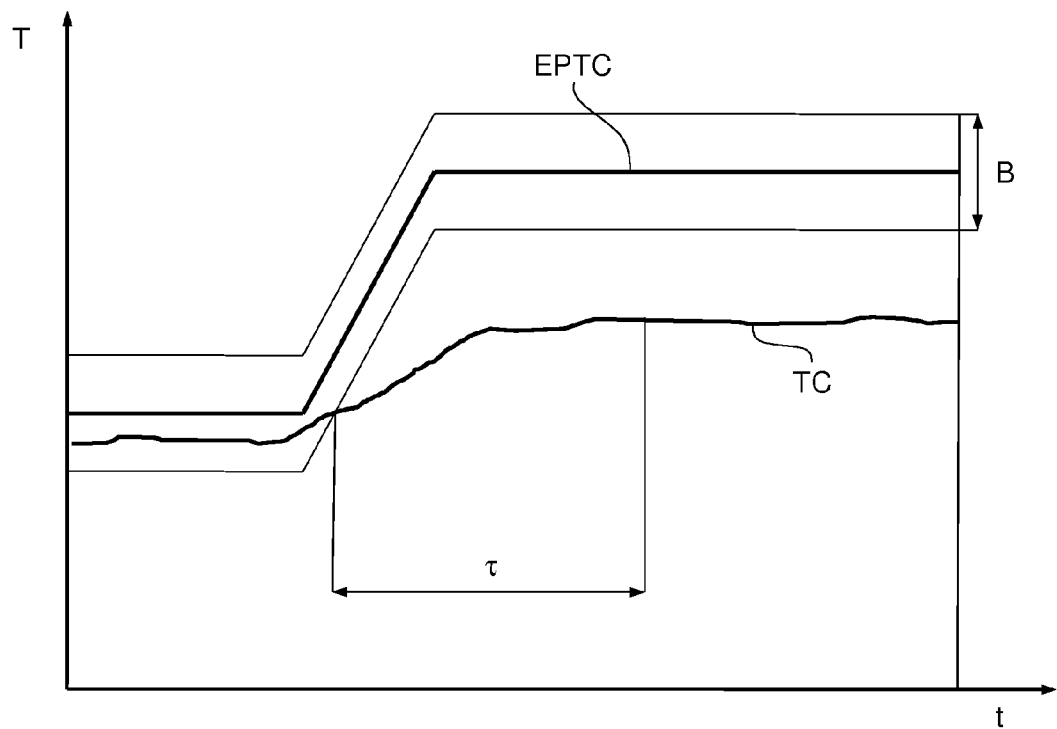
FIGS. 2 and 3 are graphs showing respective working parameters relating to the cooking equipment of FIG. 1.

Expected patterns EP of quantities measurable by the sensors 5 are defined by quantity profiles, i.e. by sequences of values indicative of the time variations of the corresponding process parameters during the respective cooking processes, as in the example of FIG. 2, where a possible pattern EPTC of the temperature TC of the oven cavity 2 is shown.

Expected patterns EP for the state of the valve 6a or other multi-state components are defined by sequences of states or changes of state during the respective cooking processes.

Figure 3:
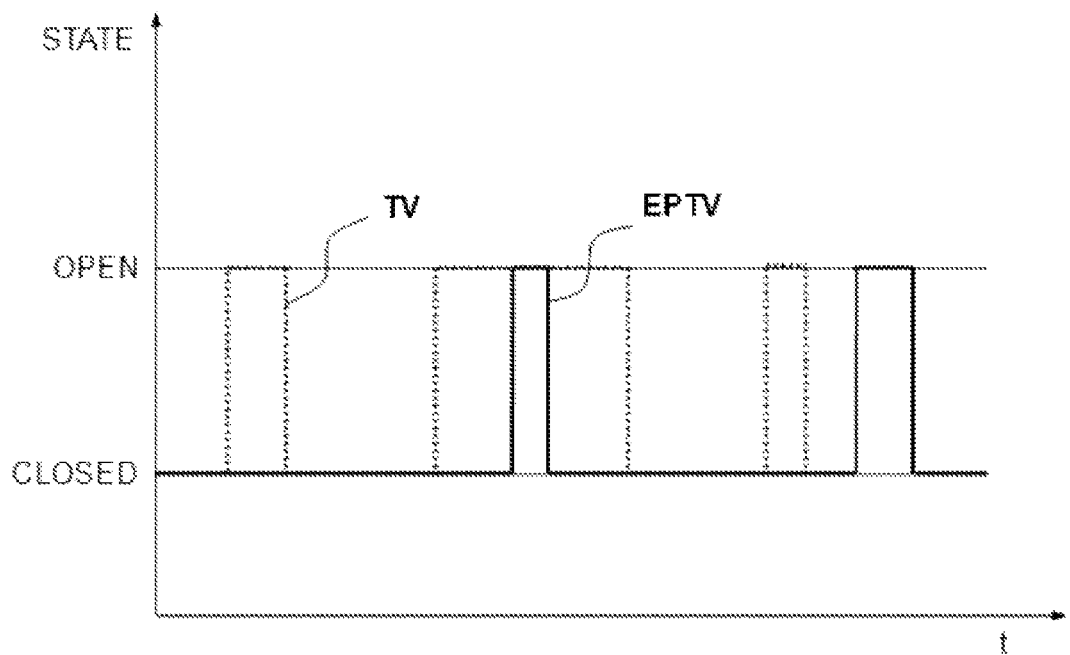
Figure 4:
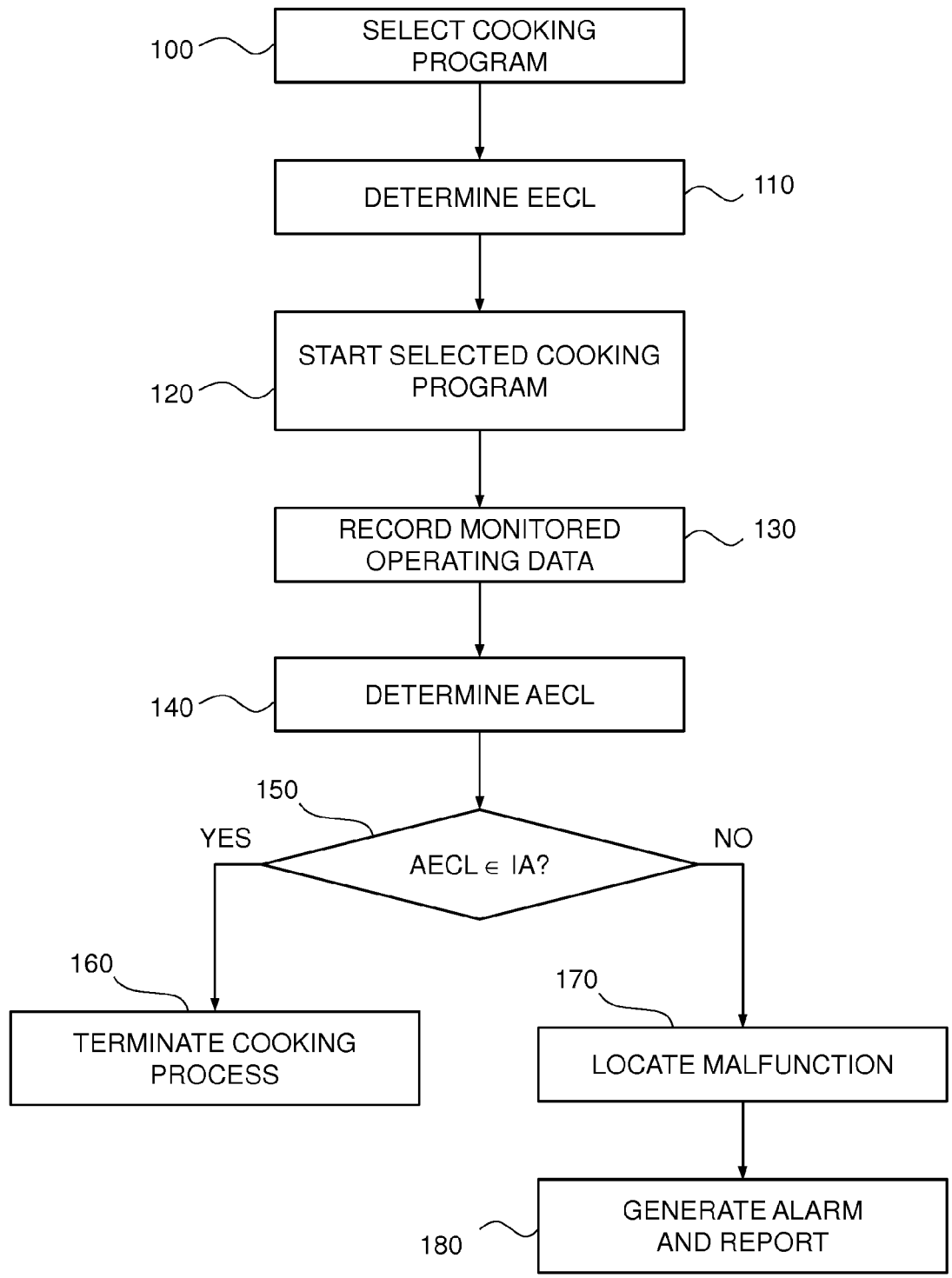
FIG. 4 is a flowchart relating to a first procedure of a method of detecting operating conditions of a cooking equipment according to an embodiment of the present invention.

For each cooking program, the third database 16 may include expected patterns EP of one or more of the monitored operating data. FIG. 3 shows an exemplary expected pattern EPTV for the throttle valve 6a. Procedures for determining operating conditions of the cooking equipment 1 will be hereinafter described, with reference to FIG. 4.

A cooking program is initially selected by a user through the user interface 7 (block 100) and a parameter indicative of the amount of food to be processed is set, or alternatively is estimated based on the response time of the food temperature or of the oven cavity 2 temperature. A cooking program may include a single cooking process as well as a plurality of cooking programs, each of which may be repeated several times.

Then, the processing unit 11 determines an expected energy consumption level EECL for the selected cooking program (block 110). In one embodiment, respective partial expected energy consumption levels are calculated for individual steps of the selected cooking program, based on first energy consumption data stored in the first database 14 and on second energy consumption data stored in the second database 15. In an exemplary case, the cooking program may comprise P iterations of a first cooking process and Q iterations of a second cooking process, all in half-load conditions (i.e. with only half of the grid positions available loaded with food). A procedure for determining the expected energy consumption level EECL will be described later on with reference to FIG. 5.

The control device 8 starts the selected cooking program (block 120) and records (block 130) the monitored operating data represented by the values received from the sensors 5 and by the state of valve 6a or other monitored components, as explained above. Recorded monitored operating data are stored in the storage unit 13.

In the meantime, the processing unit 11 determines an actual energy consumption level AECL (block 140). This could be done either by directly measuring, or by estimating, the power absorbed by the cooking equipment 1.

In one embodiment, the processing unit estimates the actual energy consumption level AECL from a base energy contribution and a variable energy contribution.

The base energy contribution is substantially constant and accounts for energy required by control and auxiliary devices, but not directly linked to the cooking process. For example, activities of data processing and data storage require certain amount of energy, which is not directly used for the purpose of heating food in the oven cavity 2. Likewise, the regulators 12 need energy for operation, in excess of energy supplied to the heating sources 3 or to the steam generation unit 4. Also auxiliary functions, such as lighting of the oven cavity 2, are accounted for by the base energy contribution.

The variable energy contribution is determined on the basis of the actual activation time of the heat sources 3 and of the steam generation unit 4. In case the heat sources 3 include a gas burner, the variable energy contribution may be determined on the basis of the gas flowrate supplied to the burner.

Once the cooking process is over, the processing unit 11 compares the expected energy consumption level EECL and the actual energy consumption level AECL (block 150). If the actual energy consumption level AECL is within an interval of acceptability IA around the expected energy consumption level EECL (block 150, output YES), the cooking process is regularly terminated and correct operation of the cooking equipment 1 is determined (block 160). Otherwise (block 150, output NO), the processing unit 11 determines a malfunction of the cooking equipment 1 and runs a diagnostic procedure to locate the malfunction (block 170).

The diagnostic procedure is based on comparison of the monitored operating data recorded during the cooking process and corresponding expected patterns EP stored in the third database 16. Monitored operating data and corresponding expected patterns EP are associated with respective components. For example, measurement signal STC and an expected pattern EPTC for the temperature of the oven cavity 2 are associated with the first temperature sensor 5a, that measures the cavity temperature TC in the oven cavity 2 (see FIG. 2). Monitored operating data are considered to be indicative of a malfunction at the respective component if a deviation of the monitored operating data from the respective expected pattern EPTC is detected that meets fault detection criteria. Fault detection criteria may include e.g. the monitored operating data continuously staying outside a band B around the corresponding expected pattern EP for a control time interval τ (as in the example of FIG. 2).

The control time interval may be in turn a total duration or a percentage of the cooking time.

In the example of FIG. 2, the measurement signal STC does not conform to the corresponding expected pattern EPTC and indicates a faulty condition of the first temperature sensor 5a because the measurement signal STC (i.e. the monitored operating data) continuously remains outside the band B for over the control time interval τ. Thus, a malfunction is located at the respective component, that at the first temperature sensor 5a.

Finally, the processing unit produces an alarm and a report about the malfunction (block 180). The report may include an indication of a defective component or an indication that a malfunction has been detected, but not located.

Figure 5:
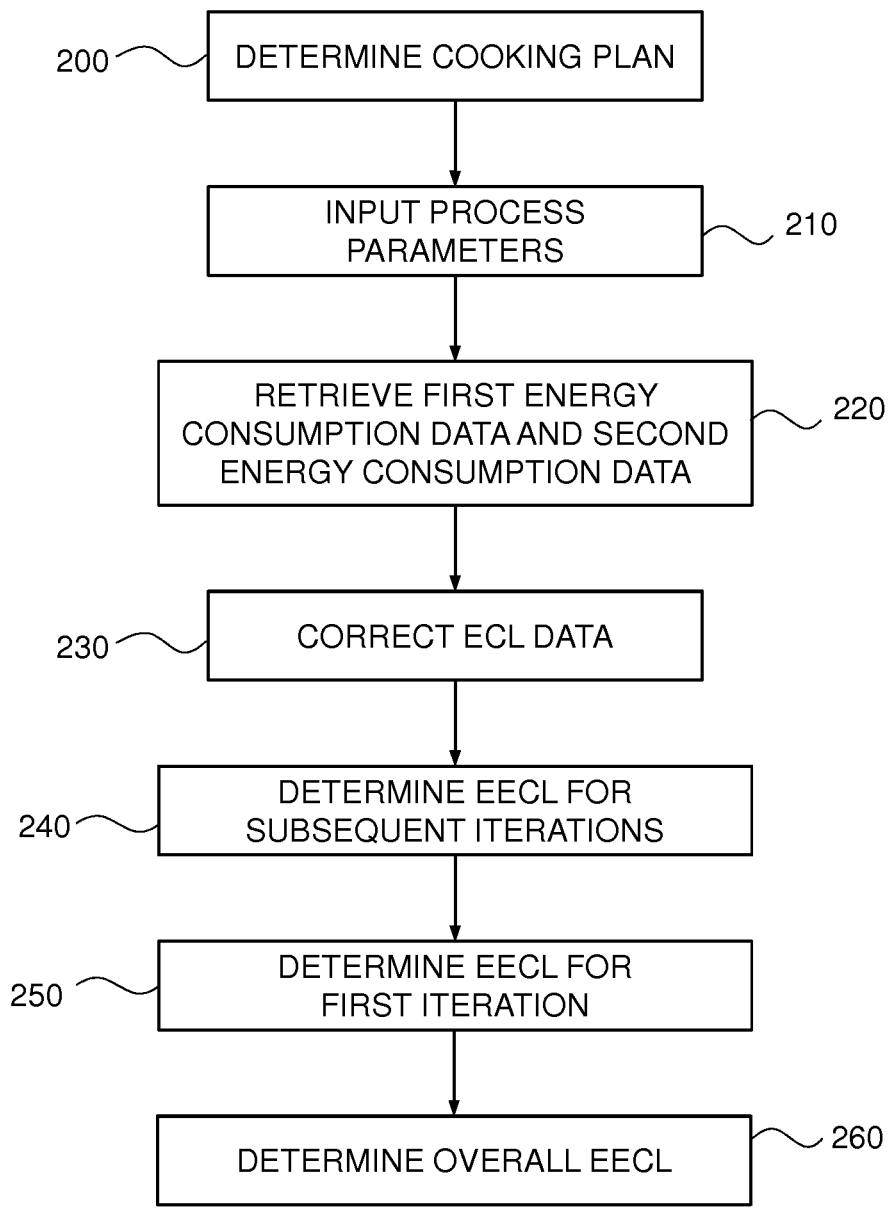
FIG. 5 is a flowchart relating to a step of the method of FIG. 4.

A procedure for determining the expected energy consumption level EECL (block 110) is illustrated in FIG. 5 and will be described hereinafter. The procedure provides the energy consumption level EECL for individual steps and for the cooking program as a whole.

A cooking plan is initially determined by selecting one or more cooking programs from the storage unit 13 through the user interface 7 (block 200). At this stage, the user may also input process parameters and is requested to indicate the total number of iterations for each cooking program and a parameter relating to the amount of food to be processed (block 210), which may be e.g. the weight of food to be processed or a logic value indicative of a full load or partial load operating condition. As previously mentioned, the weight of food could also be estimated based on the time response of the oven cavity or of the food itself.

The processing unit 11 then retrieves first energy consumption data (i.e. ECL data) from the first database 14, which correspond to the selected cooking programs, and second energy consumption data from the second database 15, which relate to the unit weight of the kind or kinds of food to be processed (block 220).

As already explained, ECL data include an initial excess energy for the first iteration of the cooking process and an ECL value. The processing unit 11 may also correct the ECL data on the basis of the input parameters and of current values of the measurement signals from the sensors 5 (block 230). If different cooking programs are to be carried out, the initial excess energy for the subsequent cooking processes may be corrected as a function of the final conditions of the cooking equipment 1 at the end of the previous cooking process.

Then, the processing unit 11 adds the retrieved first energy consumption data and the second energy consumption data, thereby obtaining the expected energy consumption level EECL associated with individual iterations subsequent to the first one (block 240). Likewise, also the initial excess energy may be modified in view of the second energy consumption data, in order to account for the type of food to be processed during the first iteration of a cooking process. An expected energy consumption level EECL is thus determined also for first or single iterations of cooking processes (block 250).

An overall energy consumption level EECL for the cooking plan is determined by multiplying the expected energy consumption levels EECL of subsequent iteration of each cooking process by the respective number of iterations input by the user (block 260).

The cooking equipment and the method described above allow to automatically detect malfunctions, which could lead to deterioration of performance. Malfunctions may be thus remedied by timely maintenance actions. Both quality of cooking and power consumption may thus benefit from recognition of incorrect operating condition.

In many cases, moreover, malfunctions can be located and faulty components identified.

The detection of malfunctions is essentially based on comparison between expected and actual power consumption, so the computational load is low and very few resources are required. Also the procedure for locating malfunctions is not demanding in terms of resources and, in addition, it may be carried out only after detection based on power consumption.

In many cases also bad use of the appliance could be identified by the system. This is true for all the cooking processes which are driven by the temperature inside the food (probe signal). If the probe is not fully inserted inside the food, the end process temperature will be reached in a shorter time, thus the consumption will be lower than the expected. In this way, the system will recognize an error and will address the reason to the probe signal. The pattern of probe will be recognized as compatible with a wrong probe placement profile. As a result the system will suggest to the end user to take care of the position of the probe in the future.

Clearly, changes may be made to the cooking equipment and to the method as described herein without, however, departing from the scope of the present invention as defined in the appended claims.

The invention claimed is:
1. Cooking equipment comprising:
an oven cavity;
at least one energy source, operable to provide energy to food placed inside the oven cavity;
a plurality of sensors, configured to provide respective measurement signals indicative of respective quantities relating to a cooking process for cooking food in the oven cavity; and
a control device, having at least one cooking program stored therein and configured to drive the at least one energy source in accordance with the cooking program, based on the measurement signals from the sensors;
a storage unit, which contains first data indicative of energy required to carry out the at least one cooking program; and
a processing unit, configured to determine, for the cooking program, an expected energy consumption level (EECL) from the first data and an actual energy consumption level (AECL) and to detect the presence of a malfunction based on a comparison of the expected energy consumption level (EECL) and of the actual energy consumption level (AECL), wherein the storage unit contains second data, representative of expected patterns (EP) for corresponding monitored data, that include at least a set of the measurement signals, and wherein the processing unit is configured to run, in response to detection of a malfunction, a procedure for locating detected malfunctions based on a deviation of the monitored data from the respective expected patterns (EP).

2. Cooking equipment according to claim 1, comprising at least one component having a respective state and coupled to the processing unit for supplying a respective state signal (STTV), wherein the monitored data include the state signal (STTV).

3. Cooking equipment according to claim 2, wherein the expected patterns (EP) and the corresponding monitored data are associated to respective components and the processing unit is configured to locate malfunction at one of the components if the deviation of the respective monitored data from the respective expected patterns (EP) meets fault detection criteria.

4. Cooking equipment according to claim 2, wherein the fault detection criteria include the monitored data staying outside a band (B) around the corresponding expected pattern (EP) for a time period ($\tau$).

5. Cooking equipment according to claim 1, wherein the processing unit is configured to determine the actual energy consumption level (AECL) based on an actual activation time of the heat sources.

6. Cooking equipment according to claim 1, wherein the first data include:
first energy consumption data, indicative of energy required to set and maintain, in the oven cavity, operating conditions prescribed by the at least one cooking program stored in the control device, in the absence of food; and
second energy consumption data, indicative of additional energy that is to be supplied in excess of energy of the first energy consumption data in order to have a unit weight of the food processed in accordance with the cooking program;
and wherein the processing unit is configured to determine the expected energy consumption level (EECL) based on the first energy consumption data and the second energy consumption data.

7. Cooking equipment according to claim 1, comprising a steam generation unit controlled by the control device for providing steam within the oven cavity.

8. Cooking equipment according to claim 1, wherein the measurement signals include a signal indicative of reservoir water temperature.

9. Cooking equipment according to claim 1, wherein the measurement signals further include at least one of a set of signals indicative of cavity temperature, environmental temperature, and humidity level.

10. Cooking equipment according to claim 2, wherein the at least one component is a throttle valve and the state is defined by a degree of opening.

11. A method of detecting operating conditions of a cooking equipment, the cooking equipment comprising an oven cavity and at least one energy source operable to provide energy to food placed inside the oven cavity; the method comprising:
recording monitored data indicative of respective quantities relating to a cooking process for cooking food in the oven cavity; and
driving the at least one energy source in accordance with a cooking program, based on the monitored data;
determining, for the cooking program, an expected energy consumption level (EECL) and an actual energy consumption level (AECL),
detecting the presence of a malfunction based on a comparison of the expected energy consumption level (EECL) and of the actual energy consumption level (AECL), and
locating detected malfunctions based on a deviation of the monitored data from respective expected patterns (EP).

12. The method according to claim 11, wherein the expected patterns (EP) and the corresponding monitored data are associated to respective components and the processing unit is configured to locate malfunction at one of the components if the deviation of the respective monitored data from the respective expected patterns (EP) meets fault detection criteria.

13. The method according to claim 12, wherein the fault detection criteria include the monitored data staying outside a band (B) around the corresponding expected pattern (EP) for a time period ($\tau$).

14. The method according to claim 11, wherein the actual energy consumption level (AECL) is determined based on an actual activation time of the heat sources.

15. The method according to claim 11, wherein the first data include:
first energy consumption data, indicative of energy required to set and maintain, in the oven cavity, operating conditions prescribed by the at least one cooking program stored in the control device, in the absence of food; and
second energy consumption data, indicative of additional energy that is to be supplied in excess of energy of the first energy consumption data in order to have a unit weight of the food processed in accordance with the cooking program;
and wherein the processing unit is configured to determine the expected energy consumption level (EECL) based on the first energy consumption data and the second energy consumption data.

16. The method according to claim 11, wherein the measurement signals include a signal indicative of reservoir water temperature.

17. Cooking equipment comprising:
an oven cavity;
at least one energy source, operable to provide energy to food placed inside the oven cavity;
a plurality of sensors, configured to provide respective measurement signals indicative of respective quantities relating to a cooking process for cooking food in the oven cavity; and
a control device, having at least one cooking program stored therein and configured to drive the at least one energy source in accordance with the cooking program, based on the measurement signals from the sensors;
a storage unit, which contains first data indicative of energy required to carry out the at least one cooking program; and
a processing unit, configured to determine, for the cooking program, an expected energy consumption level (EECL) from the first data and an actual energy consumption level (AECL) and to detect the presence of a malfunction based on a comparison of the expected energy consumption level (EECL) and of the actual energy consumption level (AECL),
wherein the measurement signals further include internal temperatures at different depths of a piece of food in the oven cavity.

* * * * *